US008668890B2

(12) United States Patent
Tran et al.

(10) Patent No.: US 8,668,890 B2
(45) Date of Patent: Mar. 11, 2014

(54) BASE METAL CATALYST COMPOSITION AND METHODS OF TREATING EXHAUST FROM A MOTORCYCLE

(71) Applicants: BASF Corporation, Florham Park, NJ (US); Honda Motor Co., Ltd., Tokyo (JP)

(72) Inventors: Pascaline Harrison Tran, Holmdel, NJ (US); Xinsheng Liu, Edison, NJ (US); Ye Liu, Holmdel, NJ (US); Michael P. Galligan, Cranford, NJ (US); Qinglin Zhang, Manalapan, NJ (US); Hiroyuki Horimura, Saitama (JP); Akiko Iwasa, Saitama (JP)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/867,184

(22) Filed: Apr. 22, 2013

(65) Prior Publication Data

US 2013/0323145 A1    Dec. 5, 2013

Related U.S. Application Data

(60) Provisional application No. 61/638,676, filed on Apr. 26, 2012.

(51) Int. Cl.
*B01D 53/94* (2006.01)
*B01J 23/34* (2006.01)
*B01J 23/72* (2006.01)
*F01N 3/28* (2006.01)

(52) U.S. Cl.
USPC ............ 423/213.2; 60/299; 60/301; 502/304; 502/324; 502/345

(58) Field of Classification Search
USPC .......... 502/304, 324, 345; 423/213.2; 60/299, 60/301
See application file for complete search history.

(56) References Cited

U.S. PATENT DOCUMENTS

| 5,057,483 | A | 10/1991 | Wan |
| 5,063,193 | A | 11/1991 | Bedford et al. |

(Continued)

FOREIGN PATENT DOCUMENTS

| CN | 1060793 | 5/1992 |
| CN | 1103010 | 5/1995 |

(Continued)

OTHER PUBLICATIONS

English Language Abstract of DE 10339007 Apr. 15, 2004.

(Continued)

*Primary Examiner* — Timothy Vanoy
(74) *Attorney, Agent, or Firm* — Melanie L. Brown

(57) ABSTRACT

Aspects of the invention relate to a method of treating a gas stream generated by a motorcycle, the method comprising: contacting a gas stream containing hydrocarbons, carbon monoxide and nitrogen oxides and generated by a motorcycle under both rich and lean engine operating conditions with a base metal catalyst composition, thereby removing at least a part of the hydrocarbons, carbon monoxide and nitrogen oxides in gas stream. The base metal catalyst composition comprises a support including at least 10% by weight of reducible ceria, and about 3 to about 7 wt % MnO and about 8 to about 22 wt % CuO on the reducible ceria support. The base metal catalyst composition is effective to promote a steam reforming reaction of hydrocarbons and a water gas shift reaction to provide $H_2$ as a reductant to abate NOx.

20 Claims, 18 Drawing Sheets

(56) References Cited

U.S. PATENT DOCUMENTS

| | | |
|---|---|---|
| 5,130,109 A | 7/1992 | Wan |
| 5,182,249 A | 1/1993 | Wang et al. |
| 5,206,196 A | 4/1993 | Nakano et al. |
| 5,208,198 A | 5/1993 | Nakano et al. |
| 5,382,416 A | 1/1995 | Nakano et al. |
| 5,759,947 A | 6/1998 | Zhou |
| 5,807,528 A | 9/1998 | Nakano et al. |
| 5,925,590 A | 7/1999 | White et al. |
| 5,939,354 A | 8/1999 | Golden |
| 5,965,098 A | 10/1999 | Boegner et al. |
| 5,977,017 A | 11/1999 | Golden |
| 6,046,129 A | 4/2000 | Duan et al. |
| 6,326,329 B1 | 12/2001 | Nunan |
| 6,555,492 B2 | 4/2003 | Faber et al. |
| 6,696,389 B1 | 2/2004 | Boegner et al. |
| 7,527,776 B2 * | 5/2009 | Golden et al. ............. 423/239.1 |
| 7,601,670 B2 | 10/2009 | Yasuda et al. |
| 7,767,175 B2 * | 8/2010 | Golden et al. ............. 423/213.2 |
| 7,785,551 B2 * | 8/2010 | Golden et al. ............. 423/239.1 |
| 7,985,391 B2 * | 7/2011 | Collier et al. ............. 423/239.1 |
| 8,012,439 B2 | 9/2011 | Arnold et al. |
| 8,263,032 B2 | 9/2012 | Andersen et al. |
| 2002/0147103 A1 | 10/2002 | Ruettinger et al. |
| 2007/0179053 A1 | 8/2007 | Lee et al. |
| 2009/0325793 A1 * | 12/2009 | Takeshima et al. ............ 502/304 |
| 2010/0240525 A1 | 9/2010 | Golden et al. |
| 2010/0247409 A1 * | 9/2010 | Collier et al. ................. 423/213.2 |
| 2010/0266473 A1 * | 10/2010 | Chen et al. ................. 423/245.1 |
| 2010/0303712 A1 * | 12/2010 | Nagaoka et al. ............. 423/651 |
| 2011/0263417 A1 * | 10/2011 | Collier et al. ................. 502/304 |
| 2012/0141347 A1 * | 6/2012 | Collier et al. ............. 423/239.1 |
| 2012/0239478 A1 | 9/2012 | Yang et al. |

FOREIGN PATENT DOCUMENTS

| | | |
|---|---|---|
| CN | 101773830 | 7/2010 |
| DE | 10339007 A1 | 4/2004 |
| DE | 1021101104 | 8/2011 |
| EP | 393517 | 10/1990 |
| EP | 1504805 A1 | 2/2005 |
| JP | H03186346 | 8/1991 |
| JP | H0435744 | 2/1992 |
| JP | H0440045 | 4/1992 |
| JP | H04122447 | 4/1992 |
| JP | H0699067 | 4/1994 |
| JP | H07116474 | 5/1995 |
| JP | 2000042369 | 2/2000 |
| JP | 200342970 | 12/2000 |
| JP | 2007000795 | 11/2007 |
| JP | 2007283208 | 11/2007 |
| JP | 4547930 | 9/2010 |
| MD | 2607 | 11/2004 |
| WO | 95/03877 A1 | 2/1995 |
| WO | WO98/51401 | 5/1998 |
| WO | 9851401 A1 | 11/1998 |
| WO | 03051493 A2 | 6/2003 |
| WO | 2004025096 A1 | 3/2004 |
| WO | WO2009/158009 | 12/2009 |

OTHER PUBLICATIONS

"Coprecipitated CuO—MnOx Catalysts for Low-Temperature CO—NO and CO—NO—O2 Reactions", Ivanka Spassova et al, Journal of Catalysis 185, (1999), pp. 43-57.

Non-Final Office Action for U.S. Appl. No. 13/867,182 mailed Oct. 28, 2013.

* cited by examiner

BASE METAL CATALYST COMPOSITION AND METHODS OF TREATING EXHAUST FROM A MOTORCYCLE

CROSS-REFERENCE PARAGRAPH

This application claims priority to U.S. Provisional No. 61/638,676, filed Apr. 26, 2012, the entire contents of which are hereby incorporated by reference.

TECHNICAL FIELD

Embodiments of the invention generally relate to a method of abatement of hydrocarbons, carbon monoxide and nitrogen oxides in an exhaust stream. Embodiments specifically relate to methods of treating exhaust streams from a motorcycle.

BACKGROUND

Engine exhaust often contains incomplete combustion compounds such as hydrocarbons, carbon monoxide (CO) and nitrogen oxides (NOx). These compounds have to be removed from engine exhaust for air pollution control and to satisfy various government regulations. There are various systems that have been created for various types of engines and fuel configurations to address the challenging emission control problems. These include three way catalysts, close-coupled catalysts, as well as filters or catalyzed filters. Most of these catalysts or combined catalyst systems are based on precious metals, including Pt, Pd and Rh. Although these noble metal catalysts are effective for mobile emission control and have been commercialized in industry, precious metals are extremely expensive. This high cost remains a critical factor for a wide variety applications of these catalysts. There is a constant need of alternative, cheaper catalysts for the effective removal of HC, CO and NOx compounds from mobile emission sources in order to meet increasingly stringent regulations.

One possible alternative has been the use of base metals. Base metals are abundant and much less costly than the precious metals. Several attempts have been made to develop base metal based catalysts for emission control. However, each of these attempts has been fraught with problems. For example, some monolith catalysts have been made that result in the formation of $AB_2O_4$ and perovskite type crystal $ABO_3$. However, formation of a perovskite structure significantly reduces the catalyst surface area. In other attempts, Cr has been used. However, Cr is highly toxic. Base metal formulations containing both Zn and Cr are likely to lead to catalyst deactivation as a result of Zn loss and regulatory barrier, due to toxicity of Cr. Other base metal catalysts have simply not been able to achieve acceptable levels of pollutant reduction.

Additionally, one area where such a catalyst would be extremely beneficial is with the treatment of exhaust from motorcycles. Motorcycles are more affordable alternatives to automobiles, and as such have become very popular. This is particularly true for some areas of the world, especially in parts of Asia where motorcycles have become extremely popular, and outnumber cars. Thus, there is still a need for an affordable, yet effective, catalyst. In particular, there is a need for such a catalyst for mobile source applications, especially for motorcycles.

SUMMARY

One aspect of the invention relates to a base metal catalyst composition effective to catalyze the abatement of hydrocarbons, carbon monoxide and nitrogen oxides under both rich and lean engine operating conditions comprising a support including at least 10% by weight of reducible ceria; and about 3 to about 7 wt % MnO and about 8 to about 22 wt % CuO on the reducible ceria support. In one or more embodiments, the kinetics of each reaction matches rich-lean cycles of engine operation dynamics. In some embodiments, the amount of MnO is about 5 wt %. In one or more embodiments, the amount of CuO is about 8 to about 12 wt %. In further embodiments, the amount of CuO is about 10 wt %. In some embodiments, the amount of CuO is about 18 to about 22 wt %. In further embodiments, the amount of CuO is about 20 wt %.

In one or more embodiments, the catalyst provides thermodynamically limiting oxidants during rich operation and reductants during lean operation and reaction kinetics needed for near complete conversion of HC, CO and NOx. In some embodiments, the support includes at least 35% by weight of reducible ceria. In one or more embodiments, the support includes up to 99% by weight of reducible ceria.

Another aspect of the invention pertains to a method of treating a gas stream generated by a motorcycle using any of the base metal catalyst compositions described herein. The method comprises contacting a gas stream containing hydrocarbons, carbon monoxide and nitrogen oxides and generated by a motorcycle under both rich and lean engine operating conditions with a base metal catalyst composition comprising a support including at least 10% by weight of reducible ceria; and about 3 to about 7 wt % MnO and about 8 to about 22 wt % CuO on the reducible ceria support, the base metal catalyst composition effective to promote a steam reforming reaction of hydrocarbons and a water gas shift reaction to provide $H_2$ as a reductant to abate NOx, thereby removing at least a part of the hydrocarbons, carbon monoxide and nitrogen oxides in gas stream.

In one or more embodiments, the kinetics of each reaction matches rich-lean cycles of engine operation dynamics. In some embodiments, the amount of MnO is about 5 wt %. In one or more embodiments, the amount of CuO is about 8 to about 12 wt %. In further embodiments, the amount of CuO is about 10 wt %. In some embodiments, the amount of CuO is about 18 to about 22 wt %. In further embodiments, the amount of CuO is about 20 wt %.

In some embodiments, the kinetics of each reaction matches rich-lean cycles of engine operation dynamics. In one or more embodiments, the catalyst provides thermodynamically limiting oxidants during rich operation and reductants during lean operation and reaction kinetics needed for near complete conversion of HC, CO and NOx. In some embodiments, the support includes at least 35% by weight of reducible ceria. In one or more embodiments, the support includes up to 99% by weight of reducible ceria.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
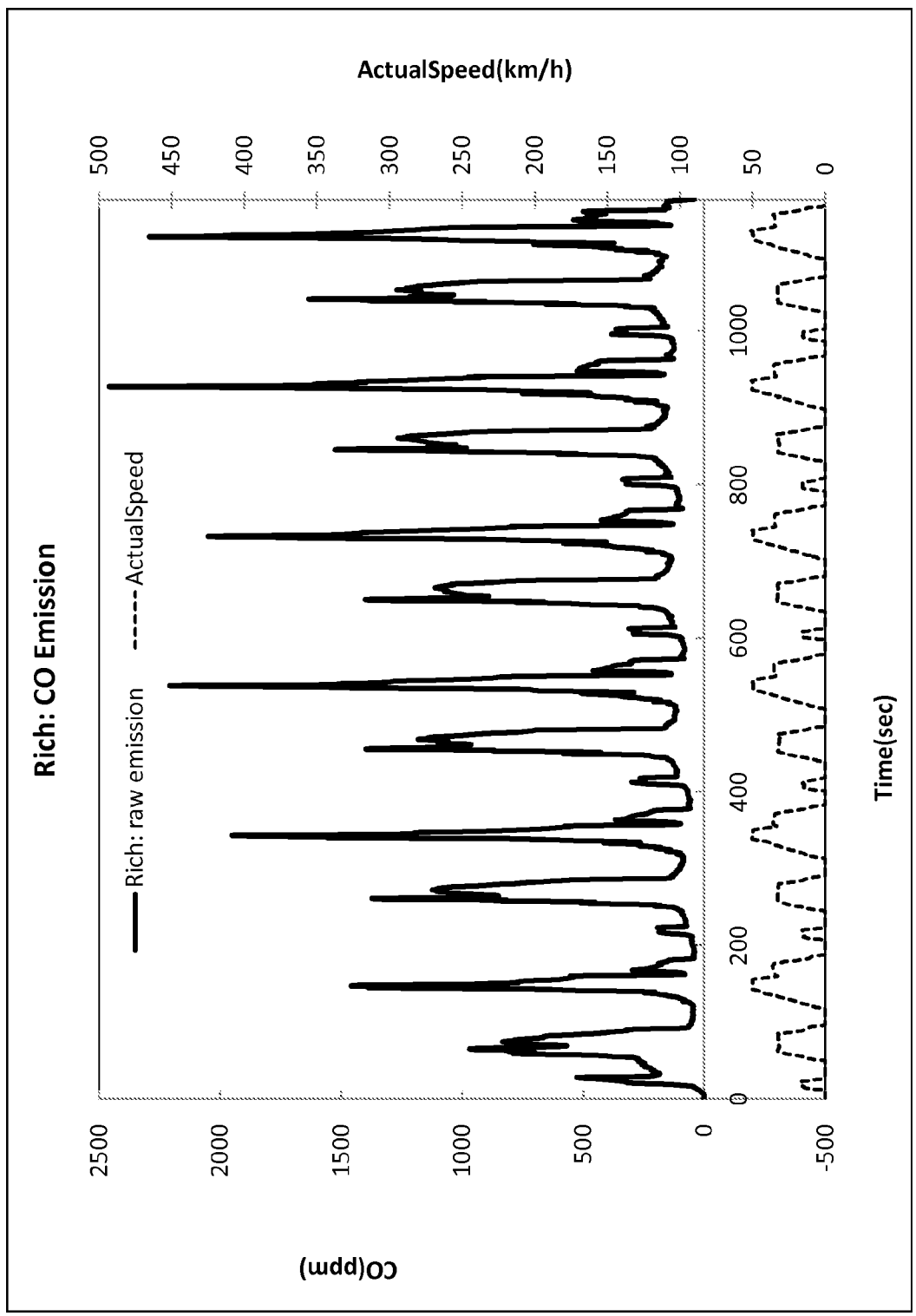
FIGS. 1A-C show the CO emission of motorcycle testing under rich conditions for raw emission and after contact with two catalyst composition in accordance with one or more embodiments of the invention, respectively.

Before describing several exemplary embodiments of the invention, it is to be understood that the invention is not limited to the details of construction or process steps set forth in the following description. The invention is capable of other embodiments and of being practiced or being carried out in various ways.

Provided herein are MnO and CuO base metal catalysts and methods of using same to abate pollutants generated from motorcycle engines.

Accordingly, one aspect of the invention relates to a method of treating a gas stream generated by a motorcycle. The method comprises contacting a gas stream containing hydrocarbons, carbon monoxide and nitrogen oxides and generated by a motorcycle under both rich and lean engine operating conditions with a base metal catalyst composition comprising a support including at least 10% by weight of reducible ceria; and about 3 to about 7 wt % MnO and about 8 to about 22 wt % CuO on the reducible ceria support, the base metal catalyst composition effective to promote a steam reforming reaction of hydrocarbons and a water gas shift reaction to provide $H_2$ as a reductant to abate NOx, thereby removing at least a part of the hydrocarbons, carbon monoxide and nitrogen oxides in gas stream. In further embodiments, the amount of MnO ranges from about 4 to about 6, and in even further embodiments, is about 5. In one or more embodiments, the amount of CuO is about 8 to about 12 wt %, and more specifically about 10 wt %. In other embodiments, the amount of CuO is about 18 to about 22 wt %, and more specifically about 20 wt %.

Another aspect of the invention pertains to the base metal catalyst composition itself. That is, this aspect pertains to a base metal catalyst composition effective to catalyze the abatement of hydrocarbons, carbon monoxide and nitrogen oxides under both rich and lean engine operating conditions comprising a support including at least 10% by weight of reducible ceria; and about 3 to about 7 wt % MnO and about 8 to about 22 wt % CuO on the reducible ceria support. Any of the above variants described with respect to the method claims may be applied to the catalyst composition as well. Thus for example, in further embodiments, the amount of MnO ranges from about 4 to about 6, and in even further embodiments, is about 5. In one or more embodiments, the amount of CuO is about 8 to about 12 wt %, and more specifically about 10 wt %. In other embodiments, the amount of CuO is about 18 to about 22 wt %, and more specifically about 20 wt %.

In one or more embodiments, the kinetics of each reaction matches rich-lean cycles of engine operation dynamics. In one or more other embodiments, the catalyst provides thermodynamically limiting oxidants during rich operation and reductants during lean operation and reaction kinetics needed for near complete conversion of HC, CO and NOx.

Although not wishing to be bound to any particular theory, it is thought that the base metal catalyst according to one or more embodiments of the invention catalyzes various reactions related to hydrocarbon, CO and NOx abatement so that the kinetics of each reaction matches the dynamics of rich-lean cycles of engine operation.

Mobile emission is characterized with oscillating gas compositions and flow rates (volume) during various driving cycles. Under so-called "rich conditions," the air-to-fuel ratio of the exhaust is less than the stoichiometric ratio required for complete oxidation of hydrocarbon and CO and reduction of NOx. Similarly, under what is known in the art as "lean conditions," there is excess air supplied, which provides more than enough oxygen for CO and hydrocarbon oxidation. However under lean conditions, there is insufficient reductant for NOx reduction.

Additionally, the temperature of engine emission may vary depending on the stage of the driving cycle, type of fuel, and engine technologies. Emission gas also contains steam as a combustion byproduct at a level of about 10%. Thus, to simultaneously convert HC, CO and NOx under both rich and lean conditions, water activation is critical. Under rich conditions, steam reforming of hydrocarbons and water gas shift reaction can make up the deficiency in oxidant ($O_2$). Similarly, the reforming and water gas shift reactions can produce more efficient reductant ($H_2$) than hydrocarbons and CO for NOx conversion under lean conditions. These catalyzed reactions are listed below:

CO: Water Gas Shift/Oxidation:

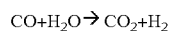
$CO+H_2O \rightarrow CO_2+H_2$

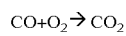
$CO+O_2 \rightarrow CO_2$

Hydrocarbons: Reforming/Oxidation:

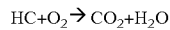
$HC+O_2 \rightarrow CO_2+H_2O$

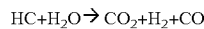
$HC+H_2O \rightarrow CO_2+H_2+CO$

NOx: Selective Catalytic Reduction (HC, CO and $H_2$ as reductants):

$NOx+CO/HC \rightarrow N_2+CO_2$

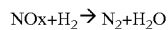
$NOx+H_2 \rightarrow N_2+H_2O$

Other reactions:

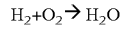
$H_2+O_2 \rightarrow H_2O$

Oxygen storage component (OSC) Redox reactions, i.e., $Ce2O3+O2 \rightarrow CeO2$ Thus, through water activation, one or more embodiments of the invention provide thermodynamically limiting oxidants/reductants and the kinetics needed for the near complete conversion of HC, CO and NOx under both rich and lean operating cycles. These formulations contain mixed base metal oxides either in solid mixed phases or in supported mixed phases. Accordingly, in one or more embodiments of the invention, the kinetics of each reaction matches rich-lean cycles of engine operation dynamics. In another embodiment, the catalyst provides thermodynamically limiting oxidants during rich operation and reductants during lean operation and reaction kinetics needed for near complete conversion of HC, CO and NOx.

In one or more embodiments, the catalyst supports contains oxygen storage components (OSC), whose valent state can be switched under emission conditions. In one embodiment, the OSC is ceria. In further embodiments, the support includes at least 35% by weight of reducible ceria. In yet other embodiments, the support includes up to about 99% by weight of reducible ceria.

Preparation

Another aspect of the invention relates to methods of preparing the catalysts used in the methods described herein. In one or more embodiments, the OSC can be prepared into solid phase mixtures through wet chemistry process such as co-precipitation, aging, drying and calcination or a dry process of chemical vapor deposition (CVD), aerosol spray dry/calcination, plasma or other processes. These elements can also be added together with active base metal components during catalyst preparation without use of the pre-formed oxides as supports.

In one or more embodiments, the mode of use of the base metal catalysts are as monolith carrier supported catalysts. There are many suitable variants for the manufacture of the catalysts described herein. The active base metal catalyst formulations can be coated on the surface of monolith structure for mobile emission applications. Monolith structures offer high geometric surface area, excellent thermal and mechanical strength, and are thus particularly suitable for mobile emission control. Any monolith structure can be used that include ceramic, metallic such as Fecralloy®, stainless steel and other metals or alloys. The monolith can be of straight channel or pattern channels, or in foam or other structures.

The active catalyst can be applied to the monolith surface using any suitable process, including slurry coating, spray coating, etc. The base metals can be applied using chemicals well-known to a person having ordinary skill in the art. For example, manganese and copper can be applied using their respective nitrate solutions.

In embodiments relating to supported base metal formulations, pre-made supports may be used for impregnation of the solution of active base metal or combination of base metals. Examples of such pre-made supports include, but are not limited to, ceria-alumina. The resulting catalyst can then be mixed with a suitable binder. Alternatively, the resulting catalyst can be calcined first, and then mixed with binder to make a suitable slurry for monolith coating. In yet other embodiments, the one or more active base metals deposited in one support may be mixed with other based metal catalysts deposited in another support to make a slurry for monolith washcoating.

The final coated monolith catalysts can then be dried at 120° C. for 2 hours and calcined at a temperature ranging from about 300 to about 1000° C. In other embodiments, the catalyst is calcined at a temperature ranging from about 400 to about 950° C. In a further embodiment, the catalyst is calcined at a temperature ranging from about 450 to about 500° C.

If a pre-made support is not used in catalyst preparation, the desired base metals may be mixed with OSC and OSC promoters to form a homogeneous solution. Then, the solution pH can be adjusted through addition of, for example, $NH_4OH$, ammine, or other structure directing agents (such as polymer or surfactants), for co-precipitation. The mother solution can then be aged to obtain the suitable particle size for monolith coating. The precipitates may also be separated by using filtering for drying and calcination. The calcined based metal solid phase mixture is then used for making a slurry and monolith coating.

EXAMPLES

There are many variations and combinations that can be made based on this disclosure to make base metal catalysts for mobile emission control without departure from the spirit of this disclosure. The following examples and embodiments are given as illustration purposes only that should not be used as limit to the invention.

Example 1

Mn and Cu nitrate salts were mixed with water to make a solution for incipient wetness impregnation of ceria oxide. The metal loadings in the impregnated catalyst are equivalent to 5 wt % $MnO_2$ and 10 wt % CuO on ceria. The impregnated sample was then mixed with water and alumina binder (3 wt %) to form a slurry that contains about 35 wt % solid. The mixture was then milled to 90% of particles having a diameter less than 10 micron.

A ceramic monolith substrate (40 mm diameter by 90 mm length) of a cell density of 300 cpsi was then used for making monolith catalyst. Catalyst was deposited on the monolith surface using a dip-coating method. After dip-coating, the monolith is then dried at 120° C. for 2 hours and calcined at 500° C. for 2 h. The catalyst wachcoat loading is 2 g/in$^3$.

Example 2

Monolith catalysts described in this example was prepared following the same procedure as described for Example 1 except that the catalysts washcoat contains 20 wt % CuO.

Performance Tests

Performance of catalysts described in the above examples was tested using the Euro 3 (ECE 40 mode) motorcycle testing protocol. Table 1 shows a summary of the motorcycle testing data with ceramic monolith catalysts (40 mm D×90 mm L) for examples 1 and 2.

TABLE 1

| Test Conditions | Catalyst | Conversion, % | | |
|---|---|---|---|---|
| | | CO | THC | NOx |
| Rich raw emission, g/Km | | 6.17 | 1.05 | 0.18 |
| Rich | 5%MnO2-10%CuO/Ceria | 61.2% | 40.2% | 36.4% |
| Rich | 5%MnO2-20%CuO/Ceria | 51.8% | 32.4% | 45.3% |
| Poor raw emission, g/Km | | 2.99 | 0.74 | 0.34 |
| Lean | 5%MnO2-10%CuO/Ceria | 66.2% | 30.1% | 1.0% |
| Lean | 5%MnO2-20%CuO/Ceria | 70.4% | 65.3% | 79.7% |

Figure 1B:
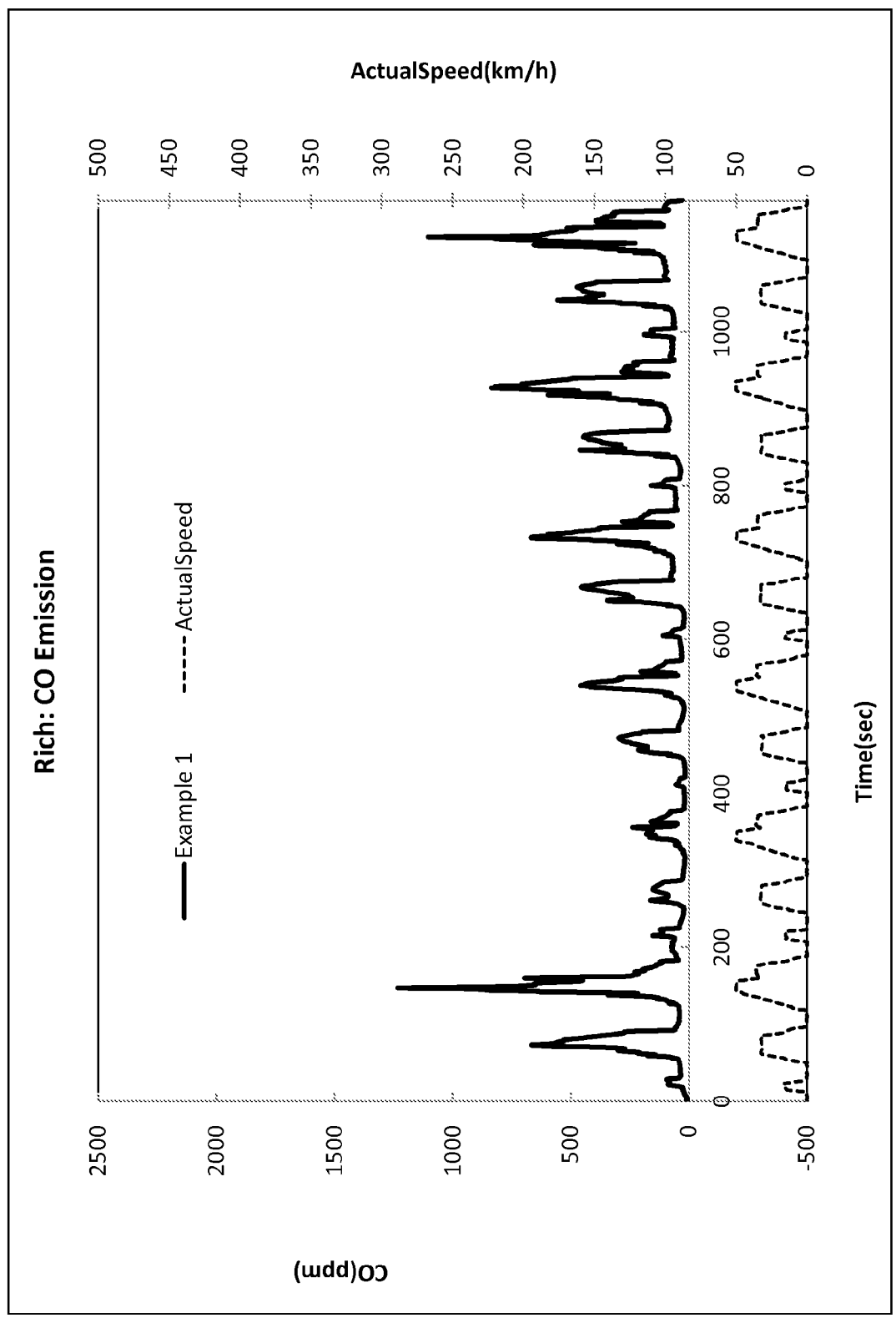
Figure 1C:
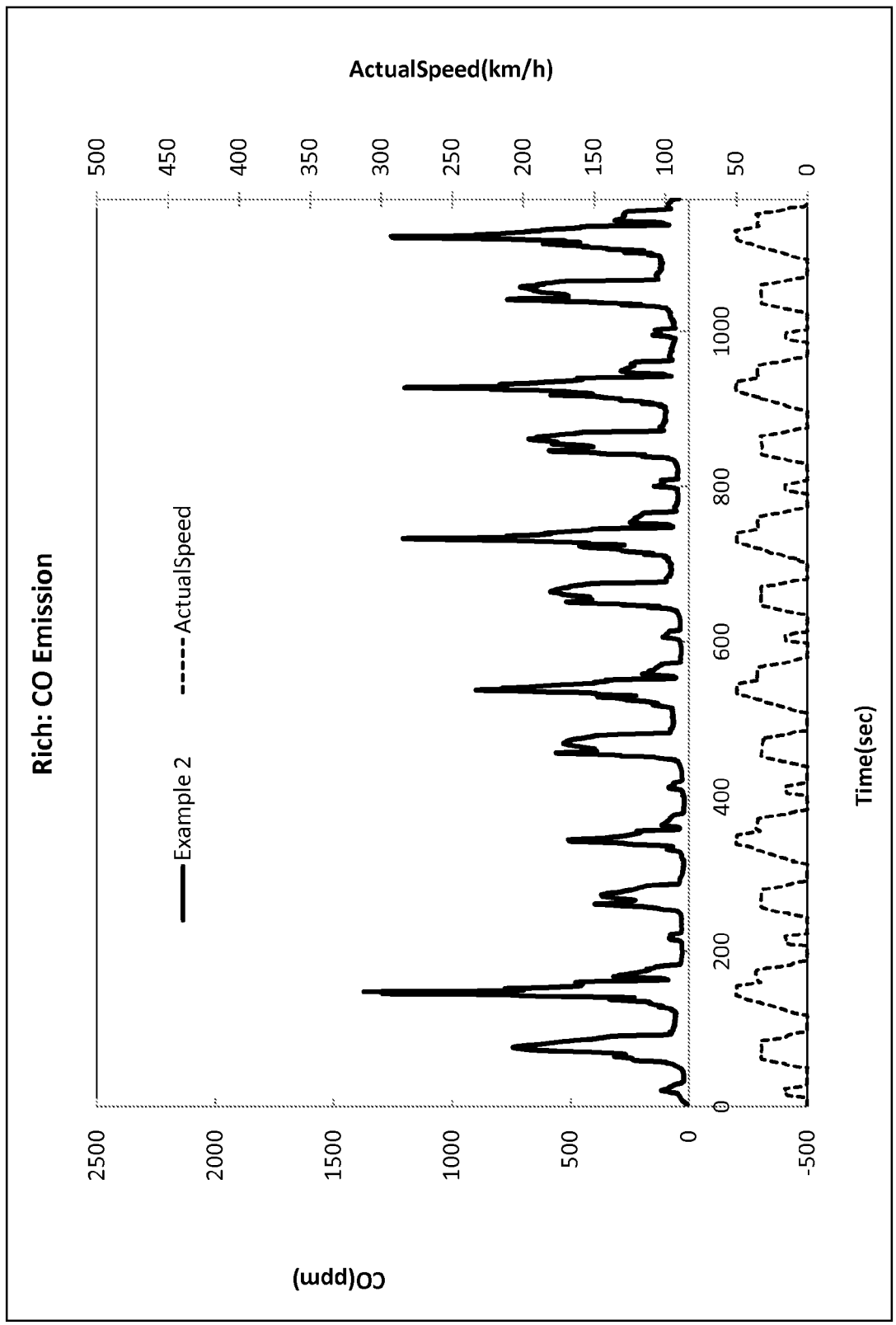
Figure 2A:
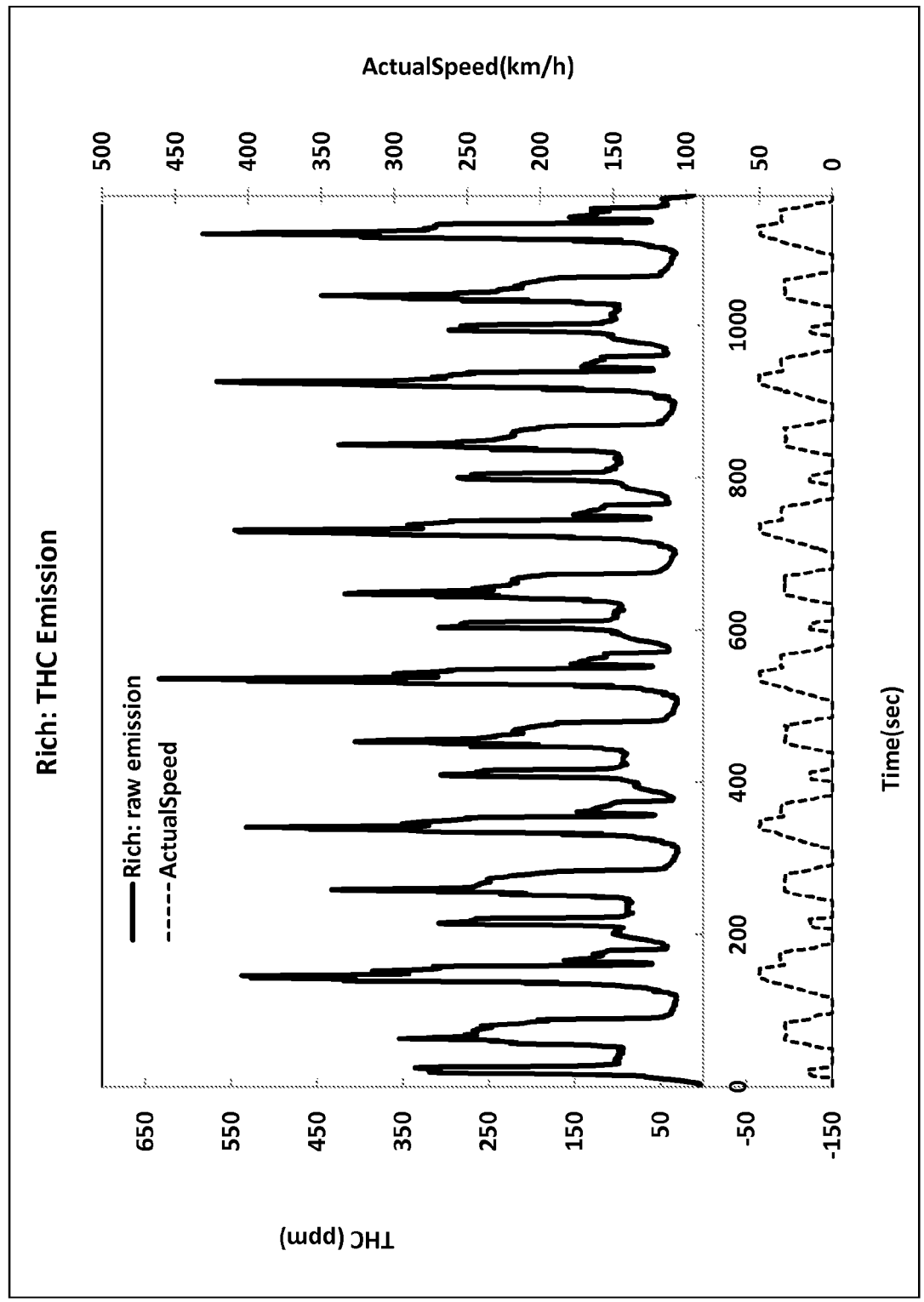
FIGS. 2A-C show the total hydrocarbons (THC) emission of motorcycle testing under rich conditions for raw emission and after contact with two catalyst composition in accordance with one or more embodiments of the invention, respectively.
Figure 2B:
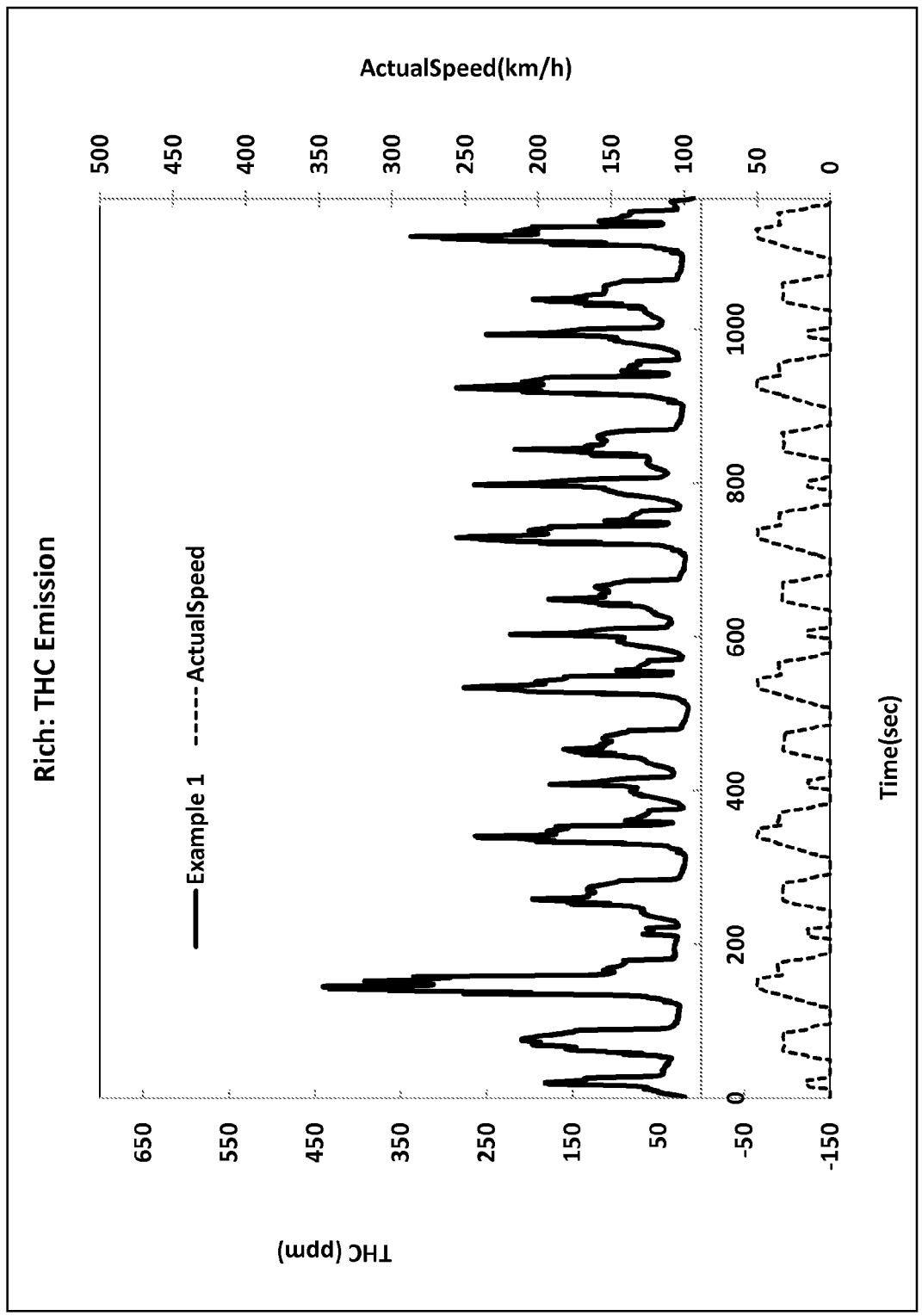
Figure 2C:
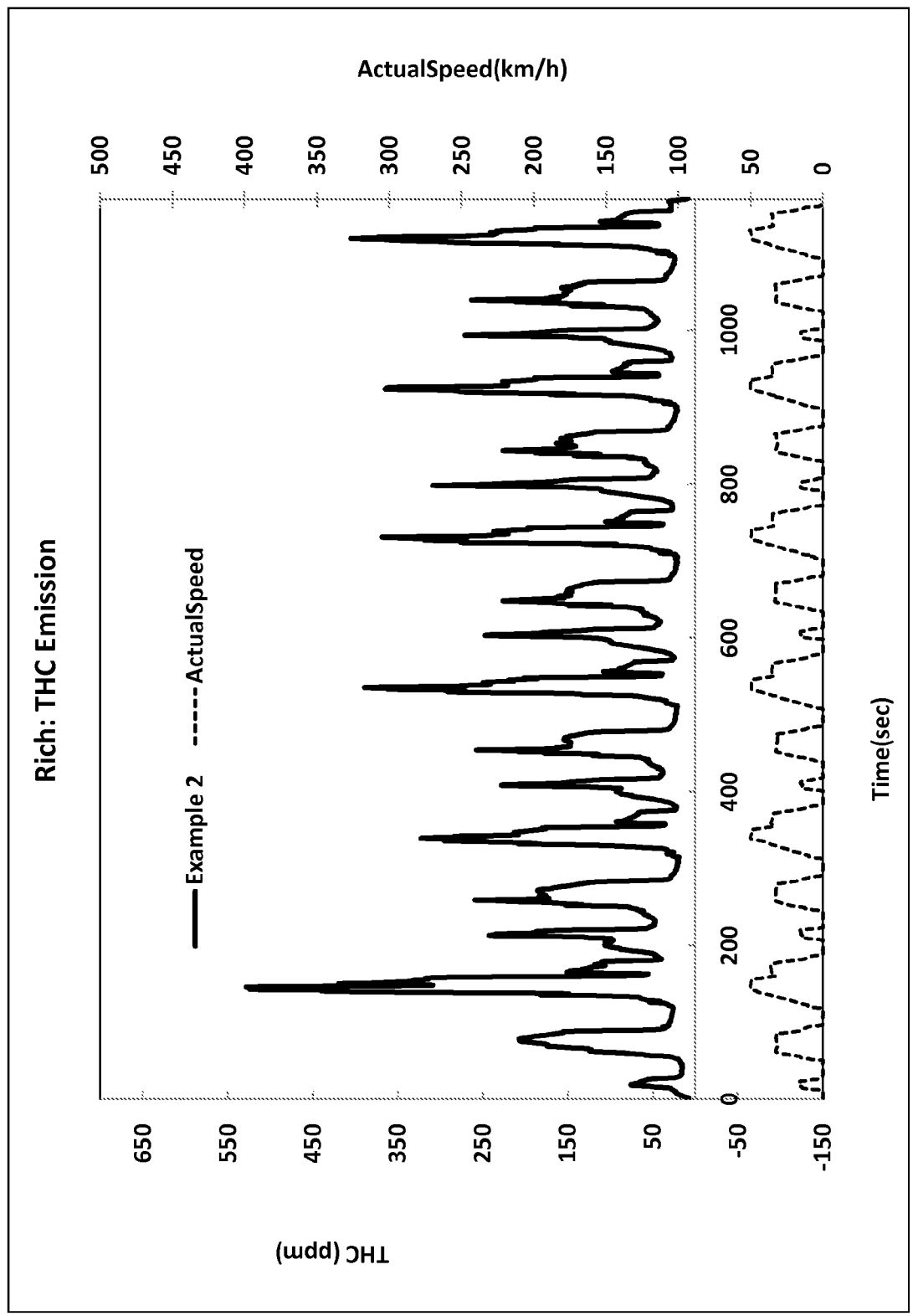
Figure 3A:
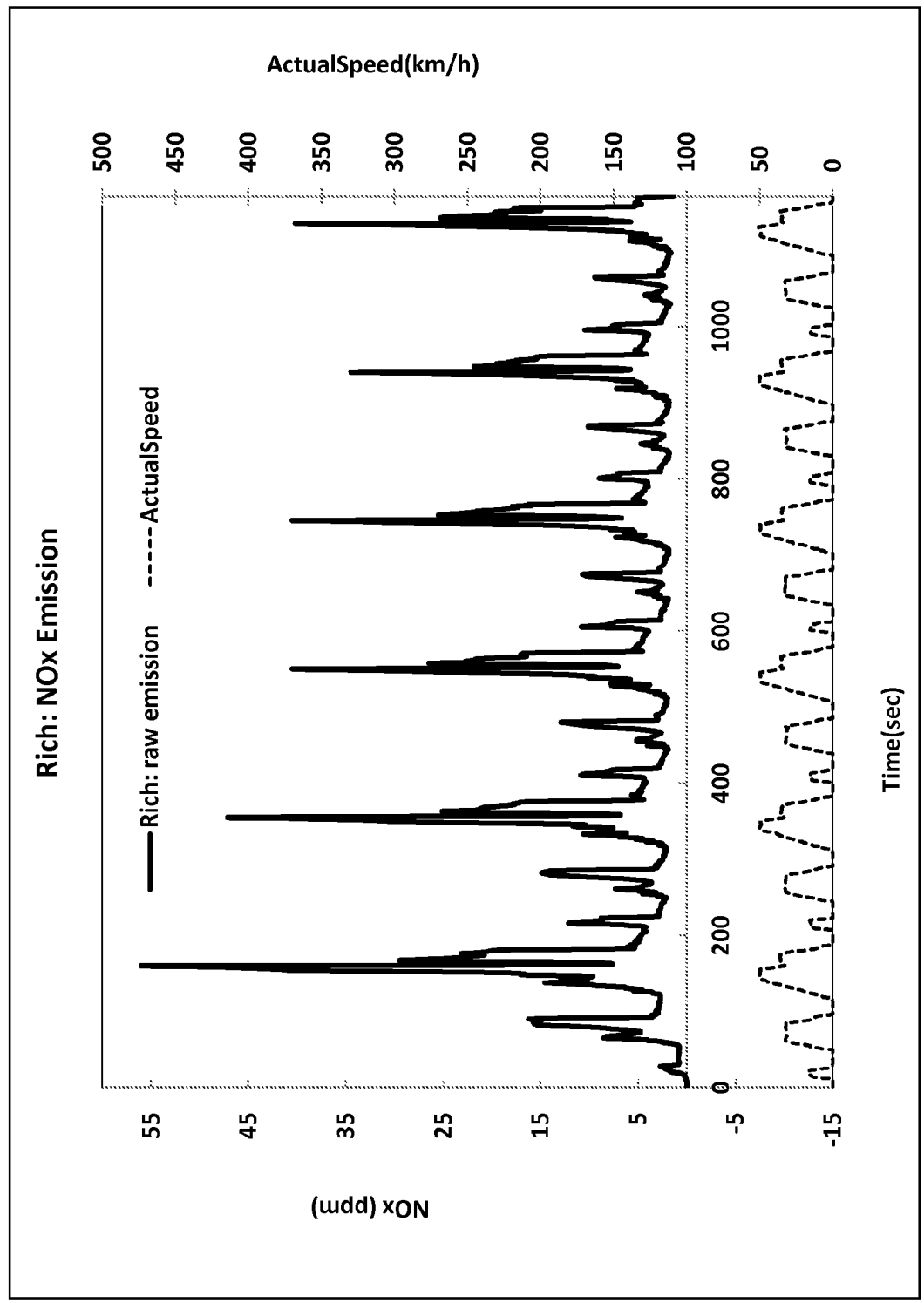
FIGS. 3A-C show the NOx emission of motorcycle testing under rich conditions for raw emission and after contact with two catalyst composition in accordance with one or more embodiments of the invention, respectively.
Figure 3B:
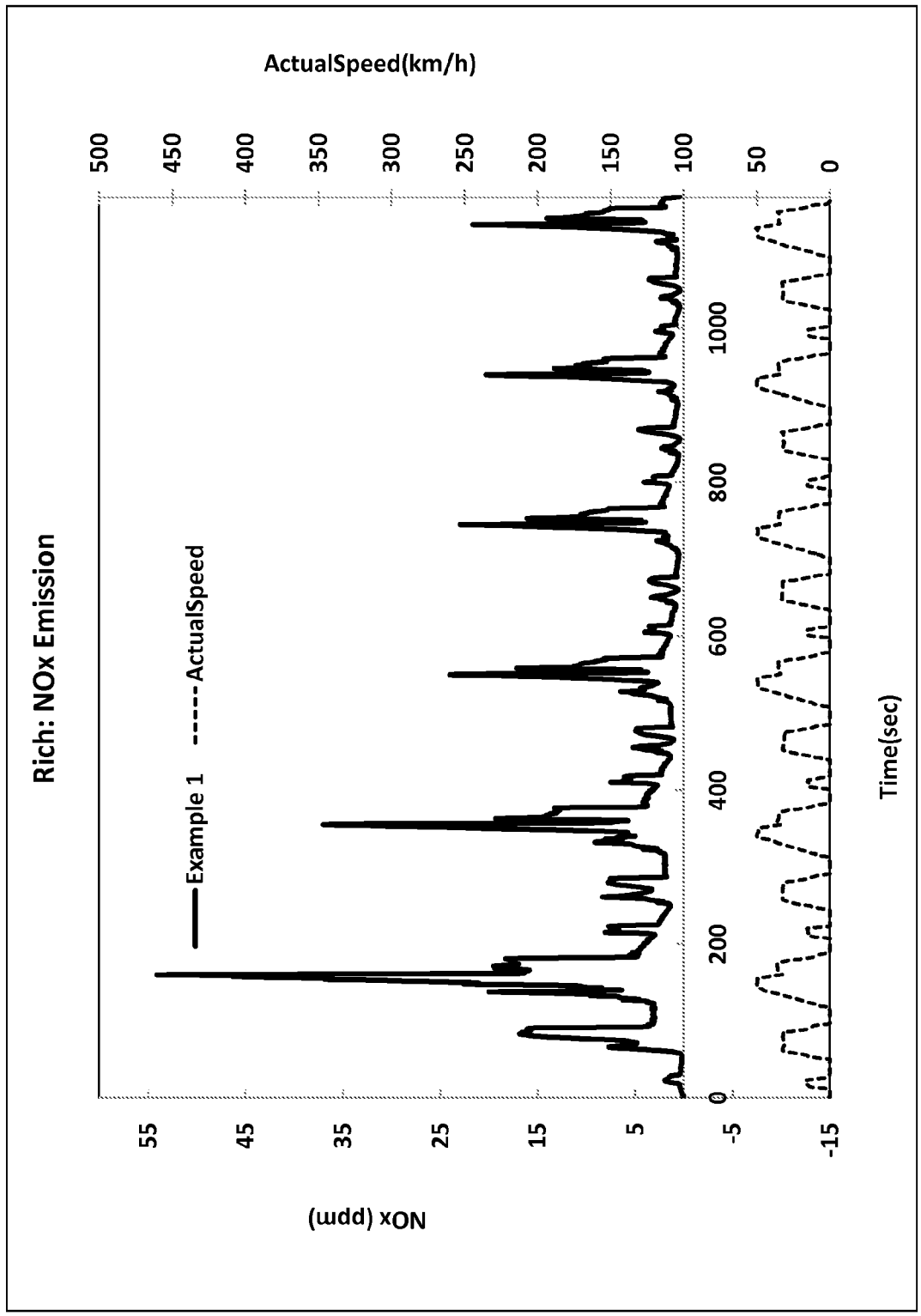
Figure 3C:
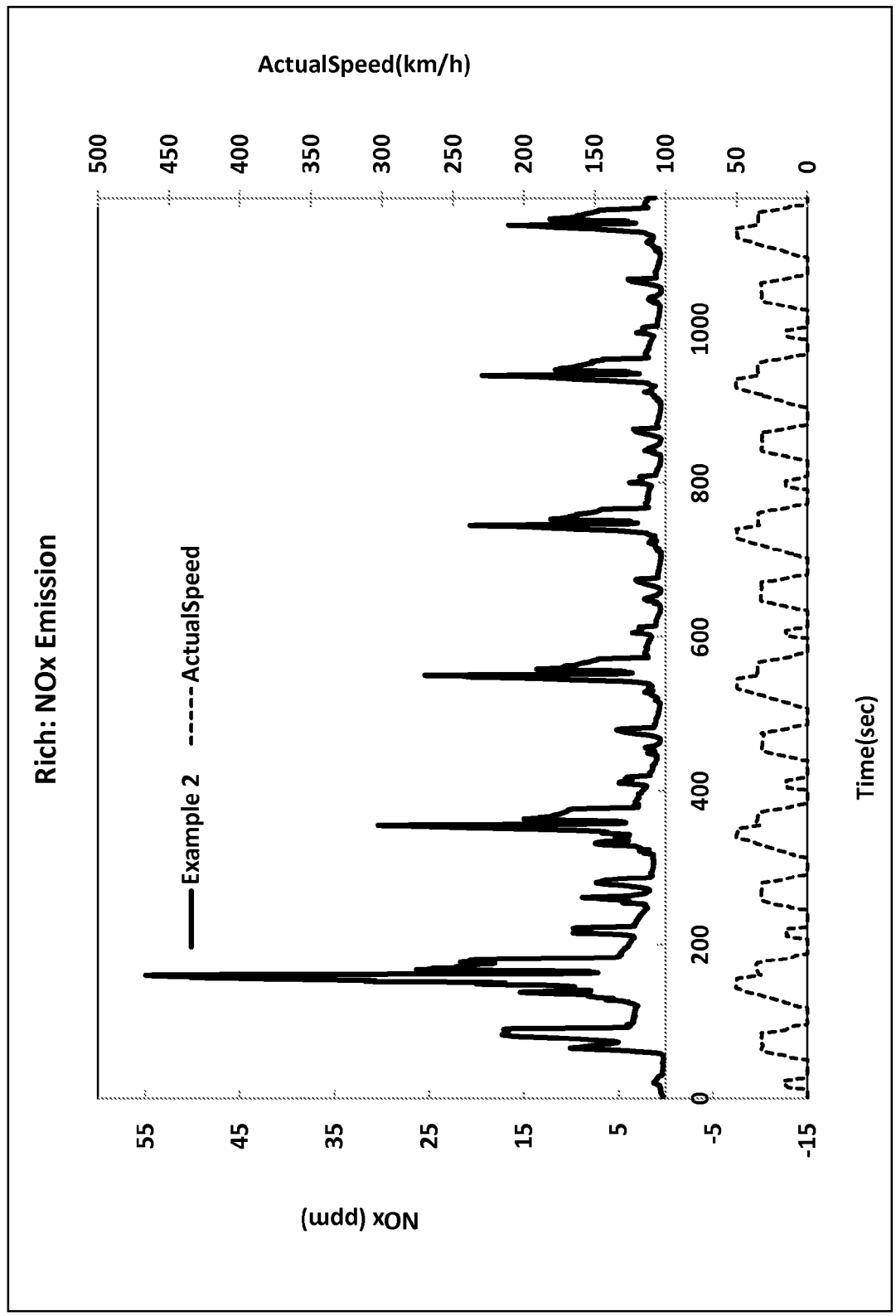

Detailed emission testing profiles were also obtained under rich and lean conditions. FIGS. 1A-1C show CO emission of the motorcycle engine under rich conditions. Specifically, FIG. 1A shows the raw emission, while FIGS. 1B and 1C show the CO emission after contact with the catalyst composition of Examples 1 and 2, respectively. FIGS. 2A-C show total hydrocarbons (THC) emissions of the motorcylce engine under rich conditions for the raw emission and after contact with the catalyst composition of Examples 1 and 2, respectively. FIGS. 3A-C show NOx emissions of the motorcylce engine under rich conditions for the raw emission and after contact with the catalyst composition of Examples 1 and 2, respectively. As can be seen from these figures, the emissions of THC, CO and NOx are all greatly reduced after initial start up (about 200 s) under rich conditions after the raw emission is contacted with the catalyst compositions of Examples 1 and 2. Further improvements in coversion of THC, CO and NOx under both rich condition can be achieved by optimizing catalyst formulation, washcoat loading and structure of the catalyst as well as reactor design.

Figure 4A:
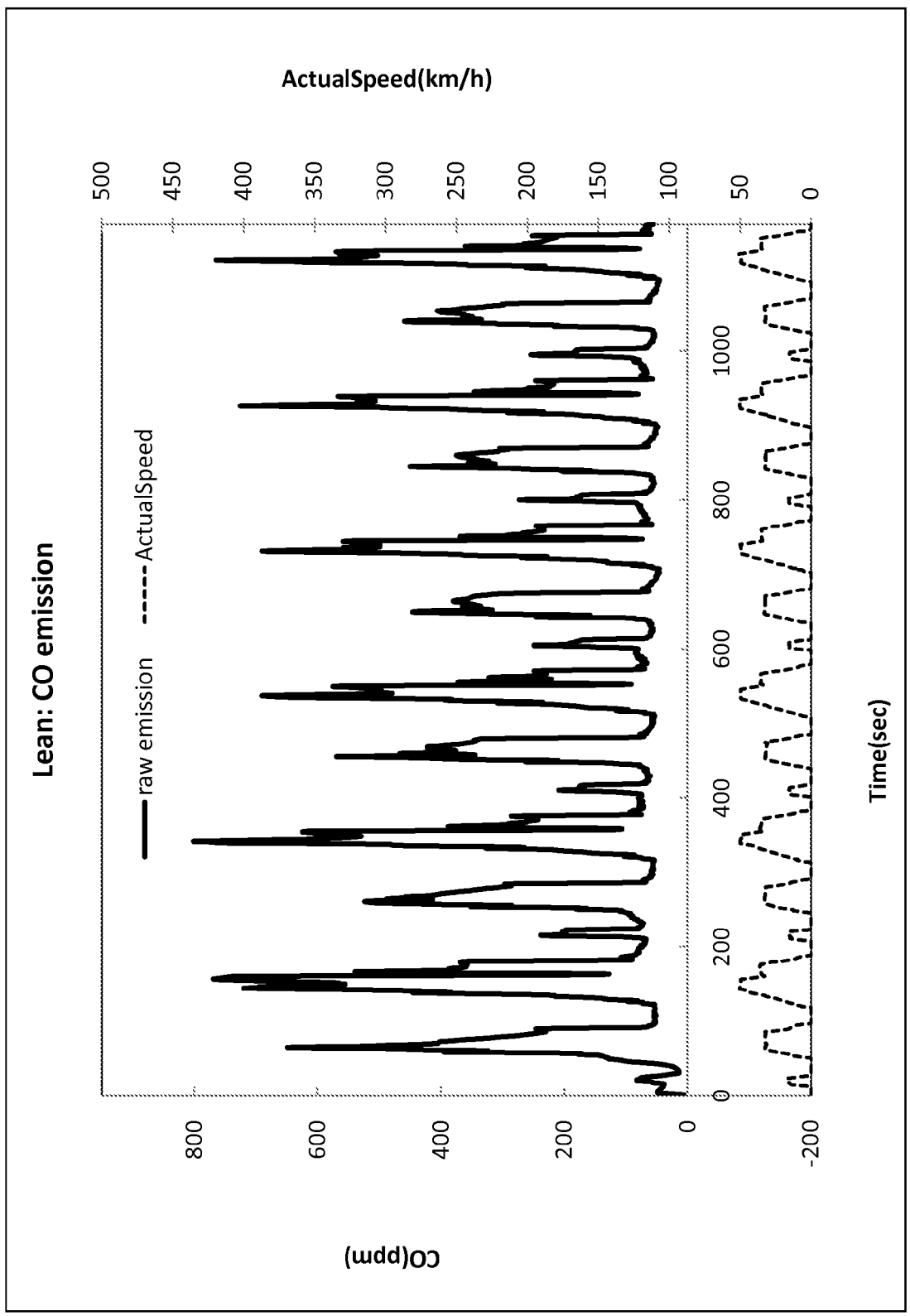
FIGS. 4A-C show the CO emission of motorcycle testing under lean conditions for raw emission and after contact with two catalyst composition in accordance with one or more embodiments of the invention, respectively.
Figure 4B:
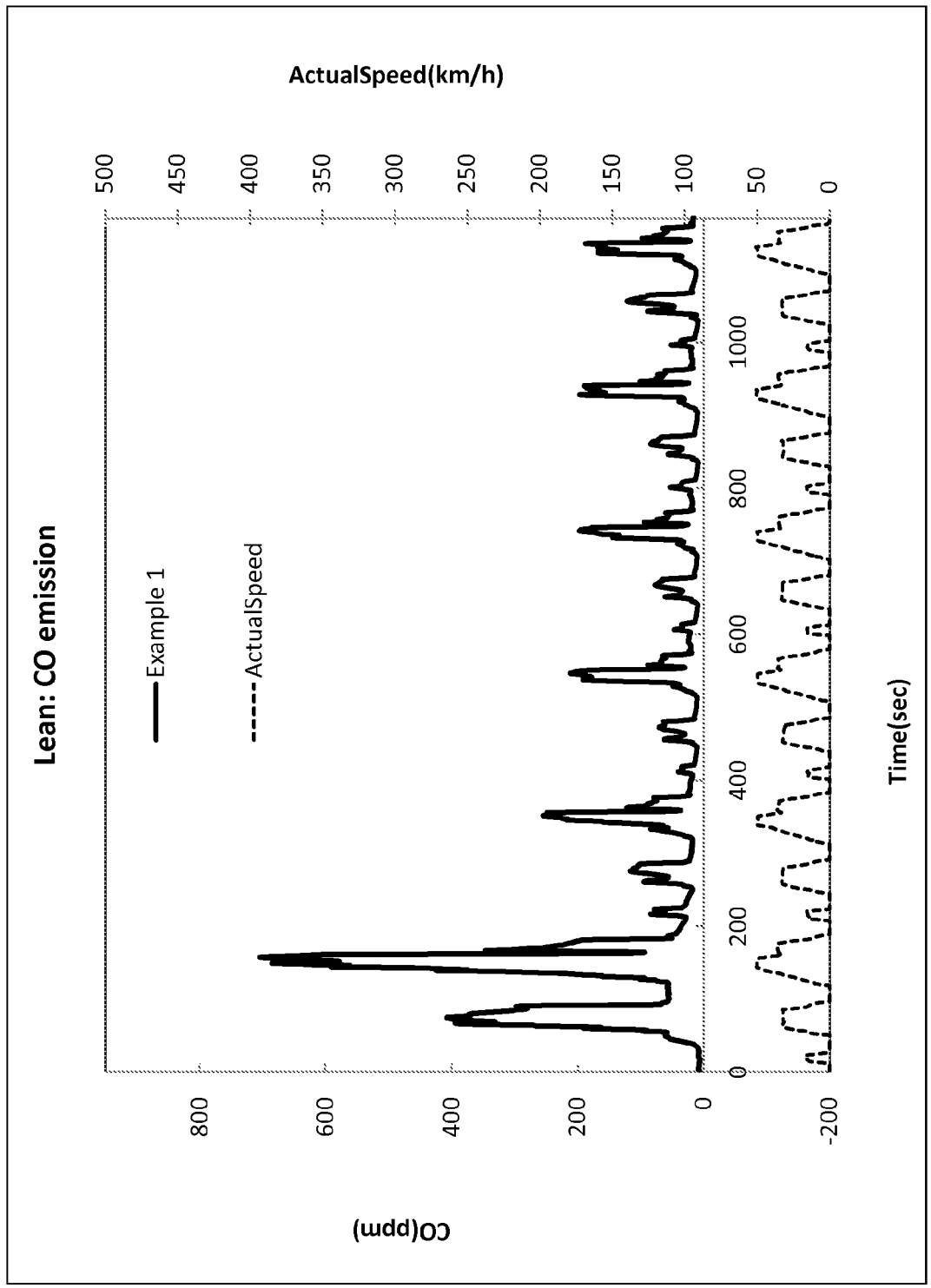
Figure 4C:
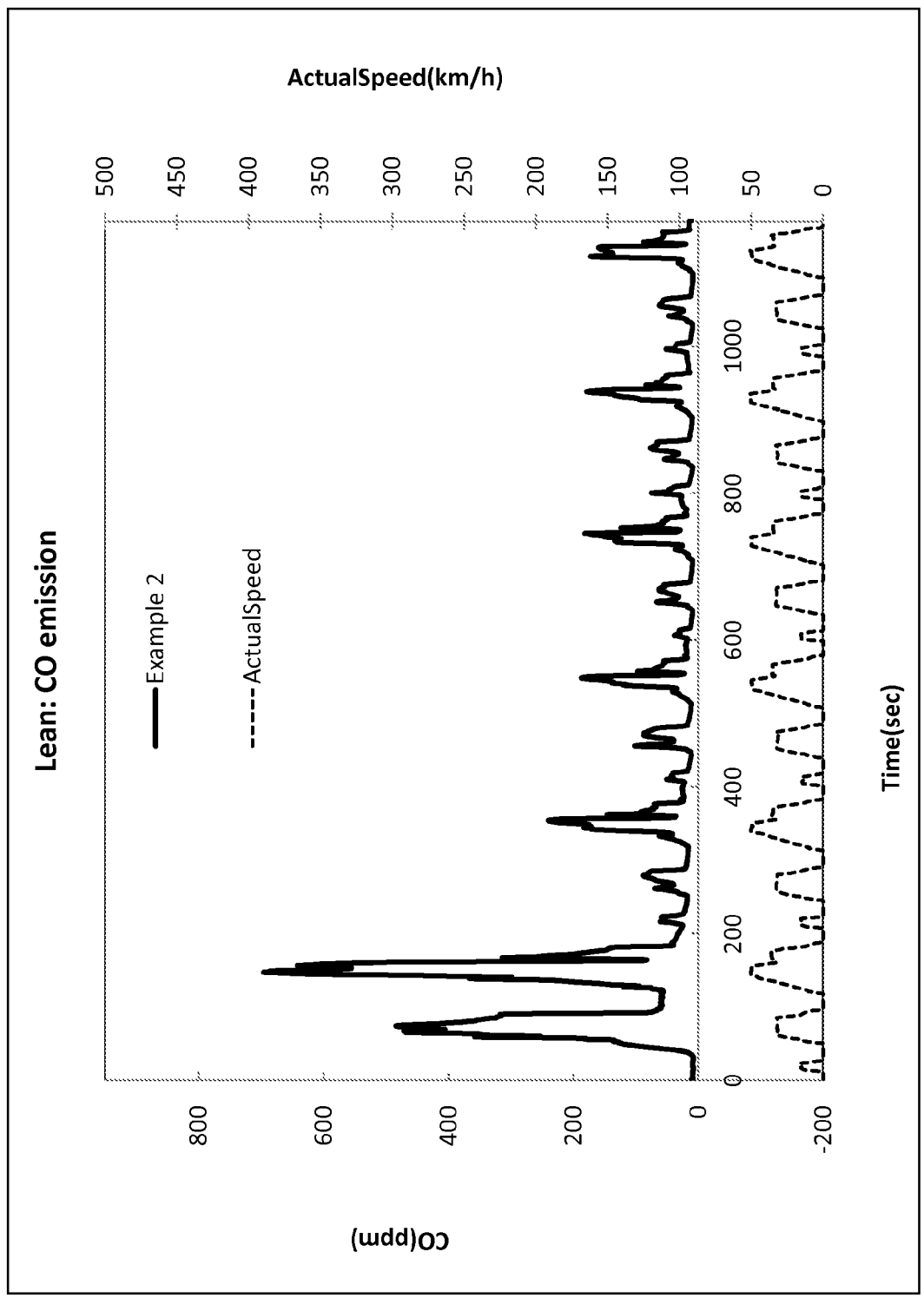
Figure 5A:
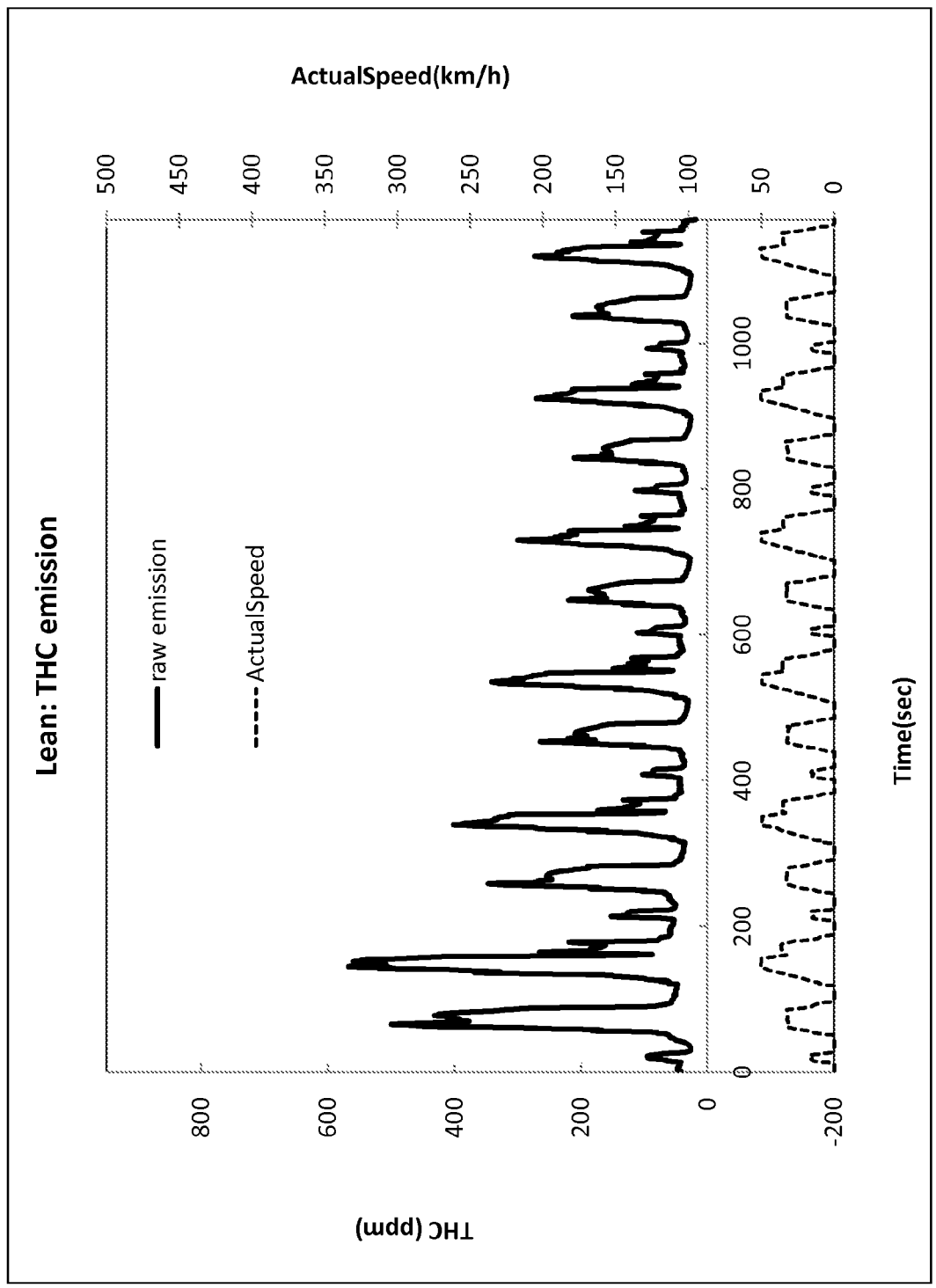
FIGS. 5A-C show the THC emission of motorcycle testing under lean conditions for raw emission and after contact with two catalyst composition in accordance with one or more embodiments of the invention, respectively.
Figure 5B:
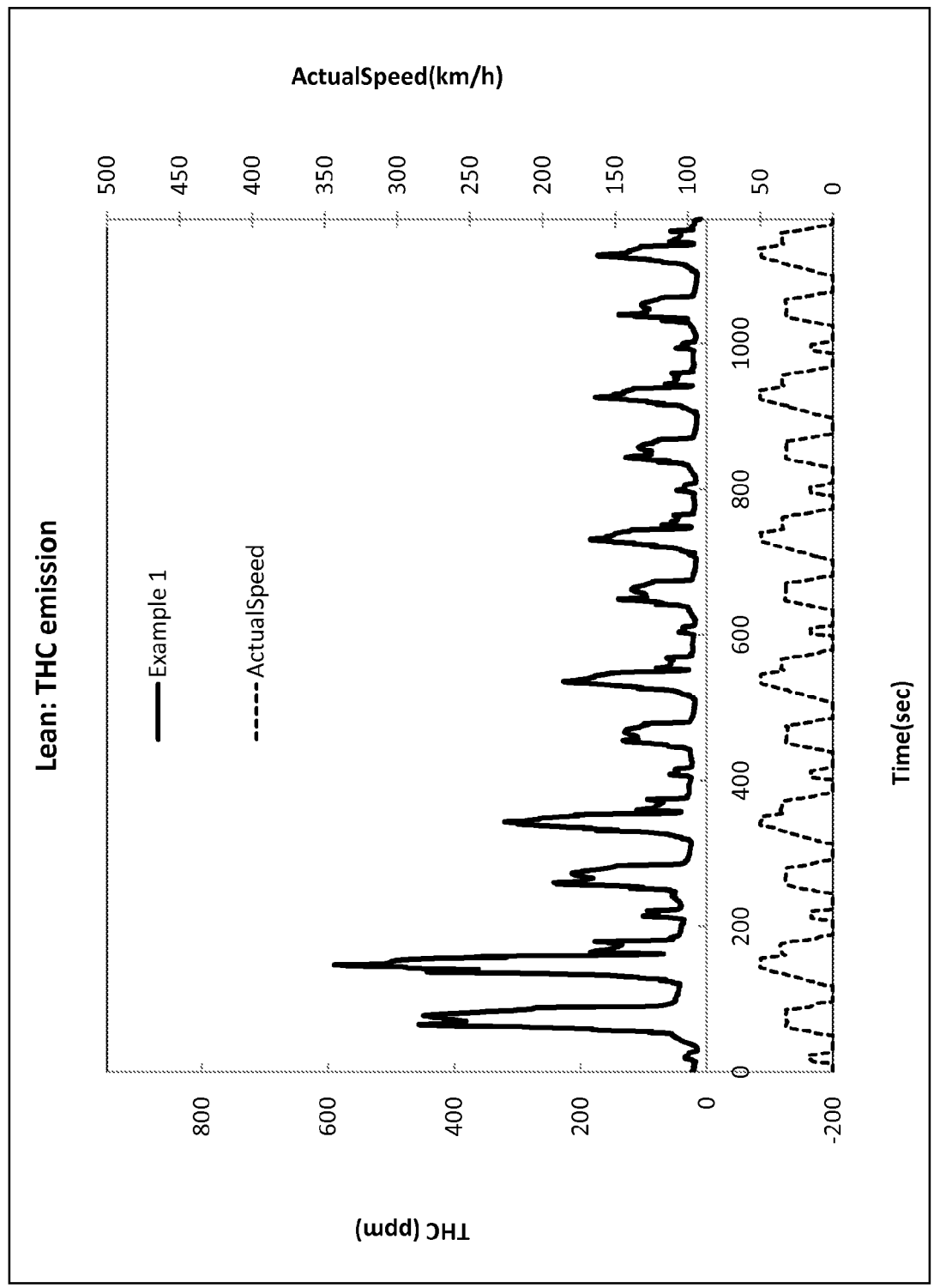
Figure 5C:
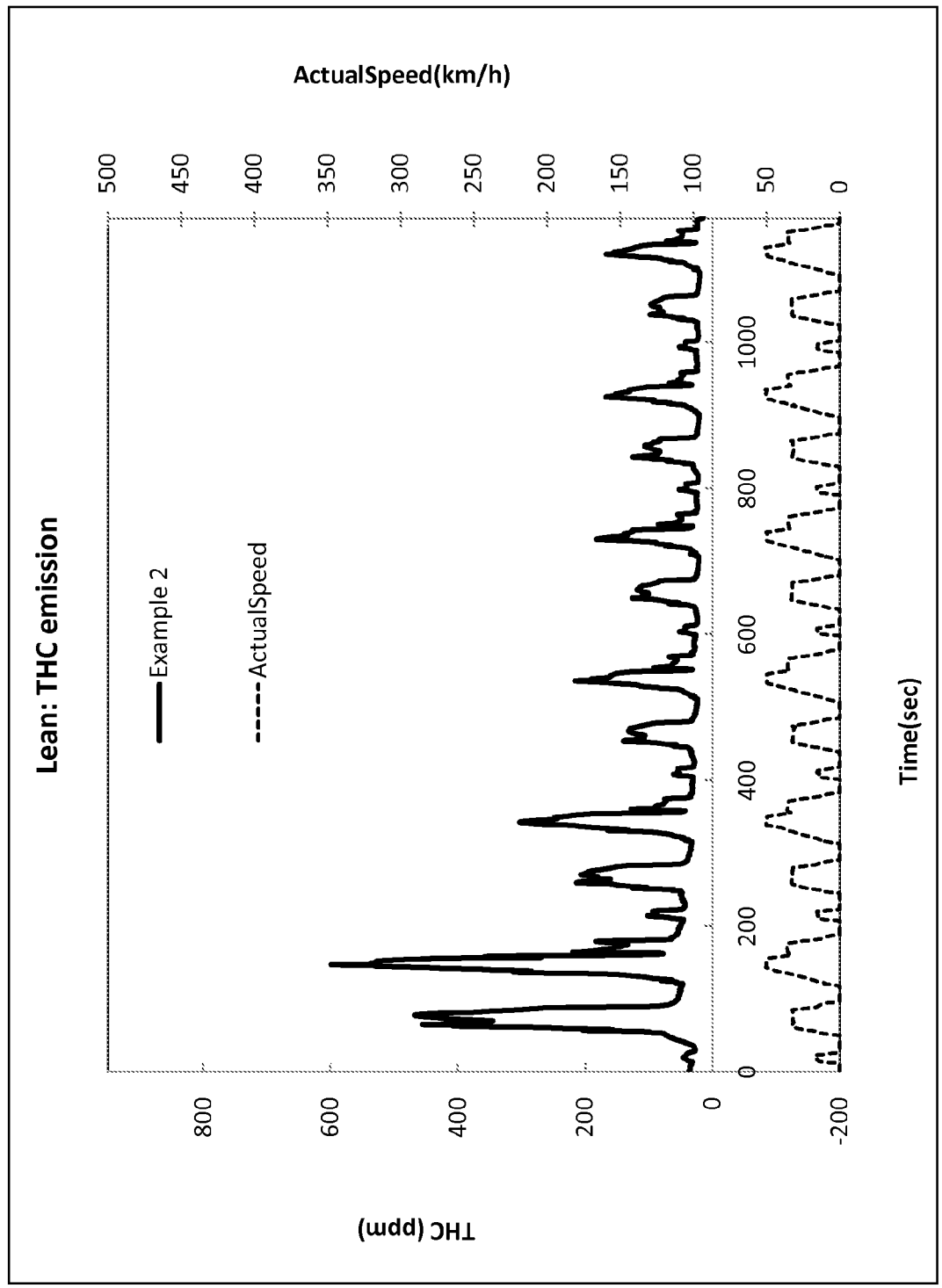
Figure 6A:
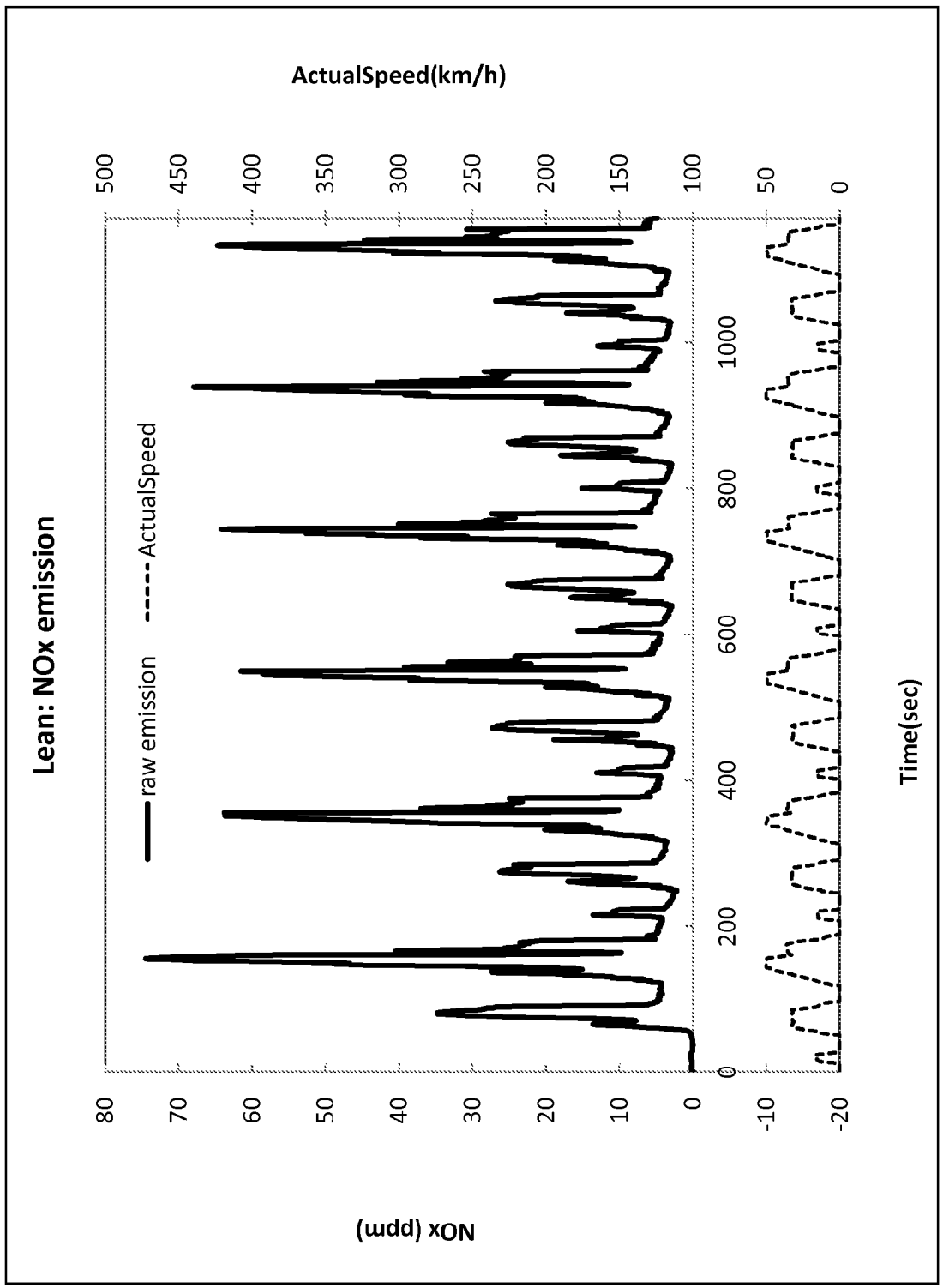
FIGS. 6A-C show the NOx emission of motorcycle testing under lean conditions for raw emission and after contact with two catalyst composition in accordance with one or more embodiments of the invention, respectively.
Figure 6B:
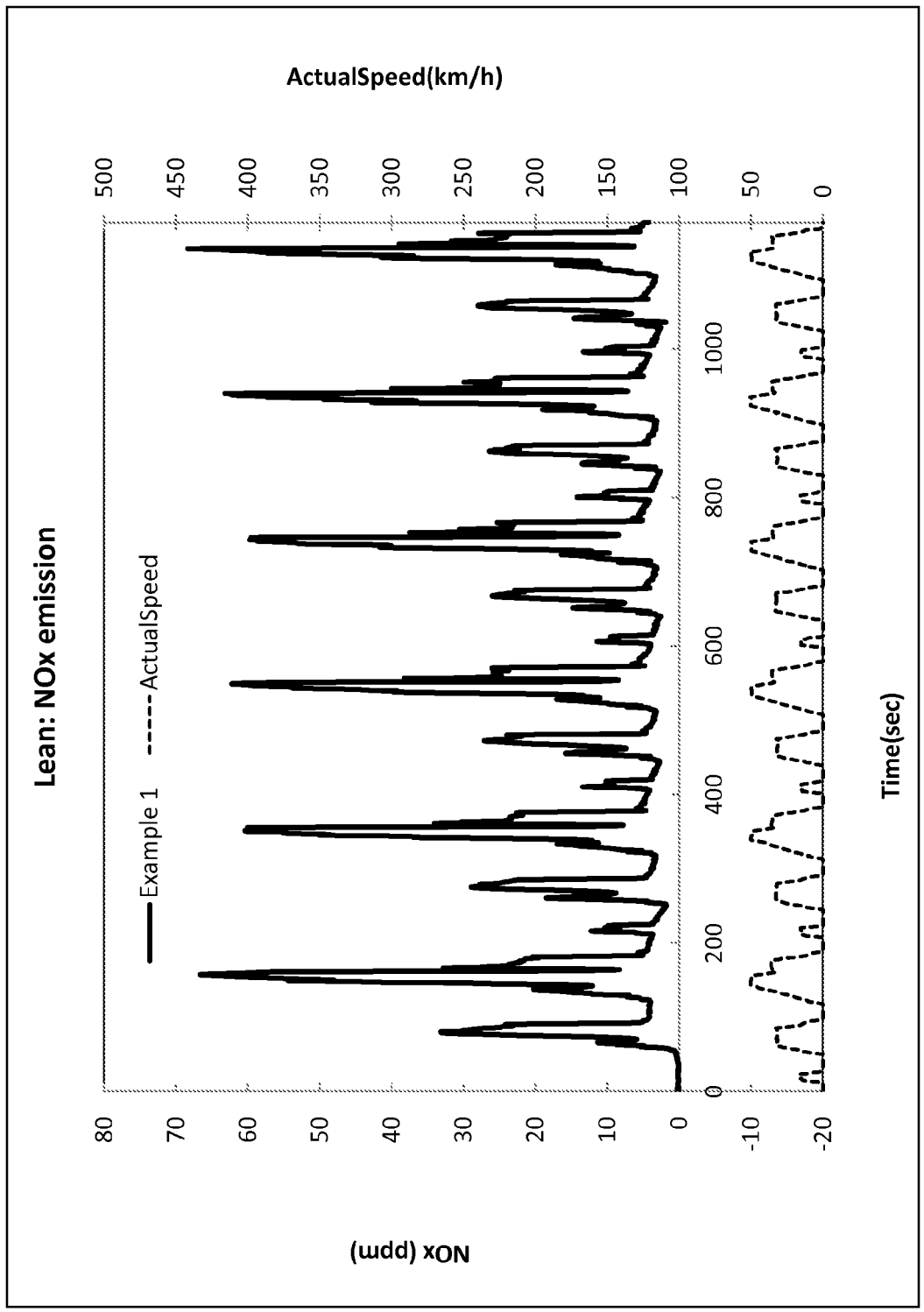
Figure 6C:
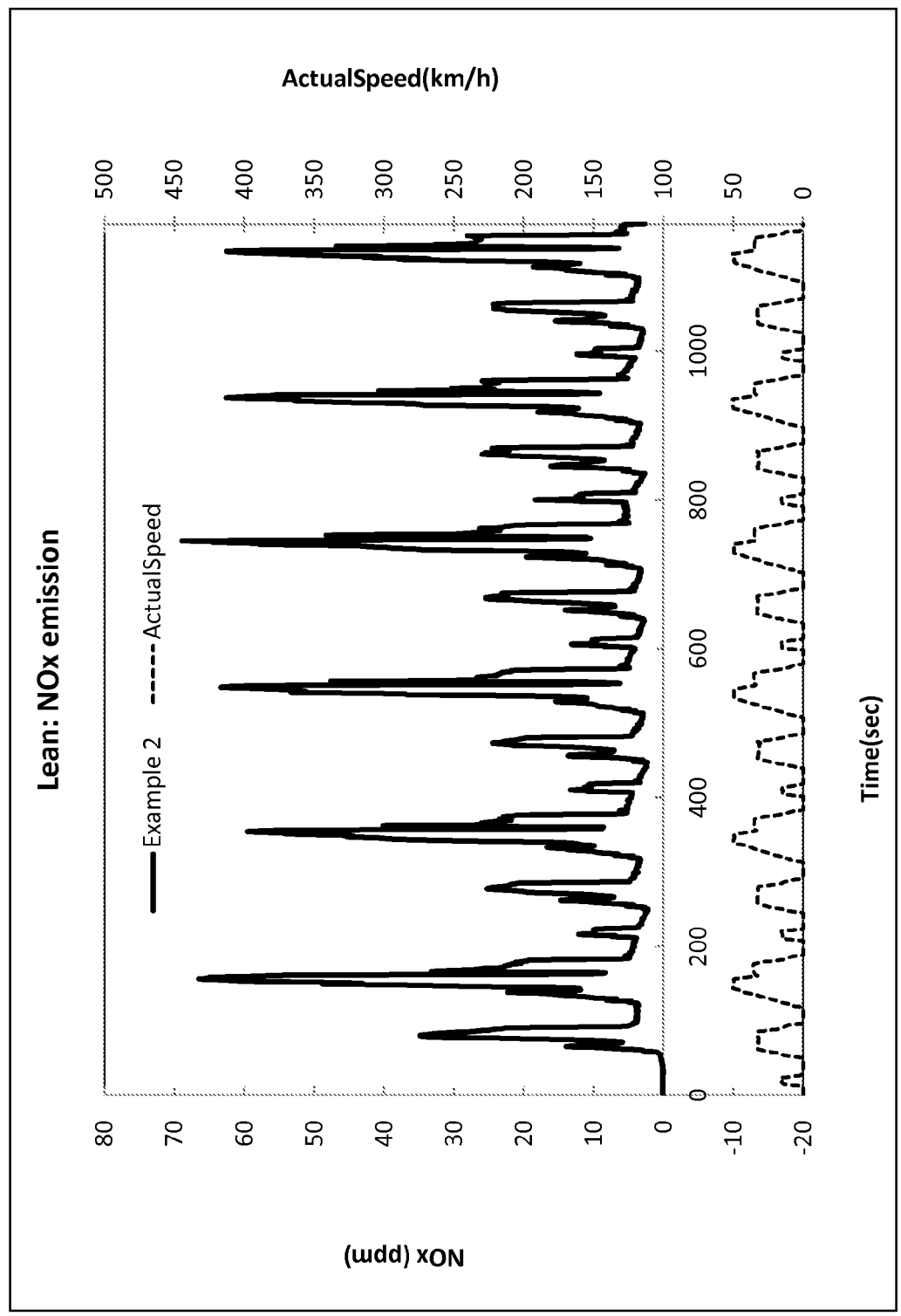

FIGS. 4A-C show CO emissions of the motorcylce engine under lean conditions for the raw emission and after contact with the catalyst composition of Example 1, respectively. After initial cool start up (about 2-3 mins), significant reduction in CO emission was observed with both catalyst Example 1 and Example 2 (FIGS. 4B and 4C). FIGS. 5A-C show total hydrocarbons (THC) emissions of the motorcylce engine under lean conditions for the raw emission and after contact with the catalyst composition of Example 1, respectively. Significant THC reduction was observed with Example 1 and 2 after initial start up (FIGS. 5B and 5C). FIGS. 6A-C show NOx emissions of the motorcycle engine under lean conditions for the raw emission and after contact with the catalyst composition of Example 1, respectively. NOx reduction under lean condition remains a challenging issue, as can be seen from FIGS. 6B and 6C). However, the emissions of THC, and CO are all greatly reduced under lean conditions after the raw emission is contacted with the catalyst composition of Examples 1 and 2. Further improvement in the three-way catalytic activity might be achieved tuning catalyst formulation and reactor design so that efficient NOx reduction can be achieved in parallel with CO and THC oxidation.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A base metal catalyst composition effective to catalyze the abatement of hydrocarbons, carbon monoxide and nitrogen oxides under both rich and lean engine operating conditions comprising
   a support including at least 10% by weight of reducible ceria; and
   about 3 to about 7 wt % MnO and about 8 to about 22 wt % CuO on the reducible ceria support.

2. The catalyst composition of claim 1, wherein the kinetics of each reaction matches rich-lean cycles of engine operation dynamics.

3. The catalyst composition of claim 1, wherein the amount of MnO is about 5 wt %.

4. The catalyst composition of claim 1, wherein the amount of CuO is about 8 to about 12 wt %.

5. The catalyst composition of claim 4, wherein the amount of CuO is about 10 wt %.

6. The catalyst composition of claim 1, wherein the amount of CuO is about 18 to about 22 wt %.

7. The catalyst composition of claim 6, wherein the amount of CuO is about 20 wt %.

8. The catalyst composition of claim 1, wherein the catalyst provides thermodynamically limiting oxidants during rich operation and reductants during lean operation and reaction kinetics needed for near complete conversion of HC, CO and NOx.

9. The catalyst composition of claim 1, wherein the support includes at least 35% by weight of reducible ceria.

10. The catalyst composition of claim 9, wherein the support includes up to 99% by weight of reducible ceria.

11. A method of treating a gas stream generated by a motorcycle, the method comprising: contacting a gas stream containing hydrocarbons, carbon monoxide and nitrogen oxides and generated by a motorcycle under both rich and lean engine operating conditions with a base metal catalyst composition comprising
   a support including at least 10% by weight of reducible ceria; and
   about 3 to about 7 wt % MnO and about 8 to about 22 wt % CuO on the reducible ceria support, the base metal catalyst composition effective to promote a steam reforming reaction of hydrocarbons and a water gas shift reaction to provide $H_2$ as a reductant to abate NOx,
   thereby removing at least a part of the hydrocarbons, carbon monoxide and nitrogen oxides in gas stream.

12. The method of claim 11, wherein the amount of MnO is about 5 wt %.

13. The method of claim 11, wherein the amount of CuO is about 8 to about 12 wt %.

14. The method of claim 13, wherein the amount of CuO is about 10 wt %.

15. The method of claim 11, wherein the amount of CuO is about 18 to about 22 wt %.

16. The method of claim 15, wherein the amount of CuO is about 20 wt %.

17. The method of claim 11, wherein the kinetics of each reaction matches rich-lean cycles of engine operation dynamics.

18. The method of claim 11, wherein the catalyst provides thermodynamically limiting oxidants during rich operation and reductants during lean operation and reaction kinetics needed for near complete conversion of HC, CO and NOx.

19. The method of claim 11, wherein the support includes at least 35% by weight of reducible ceria.

20. The method of claim 19, wherein the support includes up to 99% by weight of reducible ceria.

* * * * *